INVENTOR
JAMES R. KITTRELL
BY Roy H. Davis
ATTORNEYS

United States Patent Office 3,632,502
Patented Jan. 4, 1972

3,632,502
HYDROCRACKING CATALYST COMPRISING A LAYERED CLAY-TYPE CRYSTALLINE ALUMINOSILICATE COMPONENT, A GROUP VIII COMPONENT AND A RARE EARTH COMPONENT, AND PROCESS USING SAID CATALYST
James R. Kittrell, El Cerrito, Calif., assignor to Chevron Research Company, San Francisco, Calif.
Filed Aug. 6, 1969, Ser. No. 847,932
The portion of the term of the patent subsequent to Oct. 20, 1987, has been disclaimed
Int. Cl. C10g 11/02
U.S. Cl. 208—60
21 Claims

ABSTRACT OF THE DISCLOSURE

A hydrocracking catalyst comprising a layered clay-type crystalline aluminosilicate cracking component, 0.01 to 2.0 weight percent, based on said cracking component and calculated as the metal, of a hydrogenating component selected from platinum and compounds thereof, palladium and compounds thereof, rhodium and compounds thereof, ruthenium and compounds thereof, iridium and compounds thereof, and nickel and compounds thereof, 0.01 to 5.0 weight percent, based on said cracking component and calculated as the metal, of a component selected from the group consisting of rare earth metals and compounds thereof, and 0.0 to 2.0 weight percent, based on said cracking component and calculated as the metal, of a hydrogenating component selected from manganese and compounds thereof and iron and compounds thereof, and processes using said catalyst.

INTRODUCTION

Figure 1:
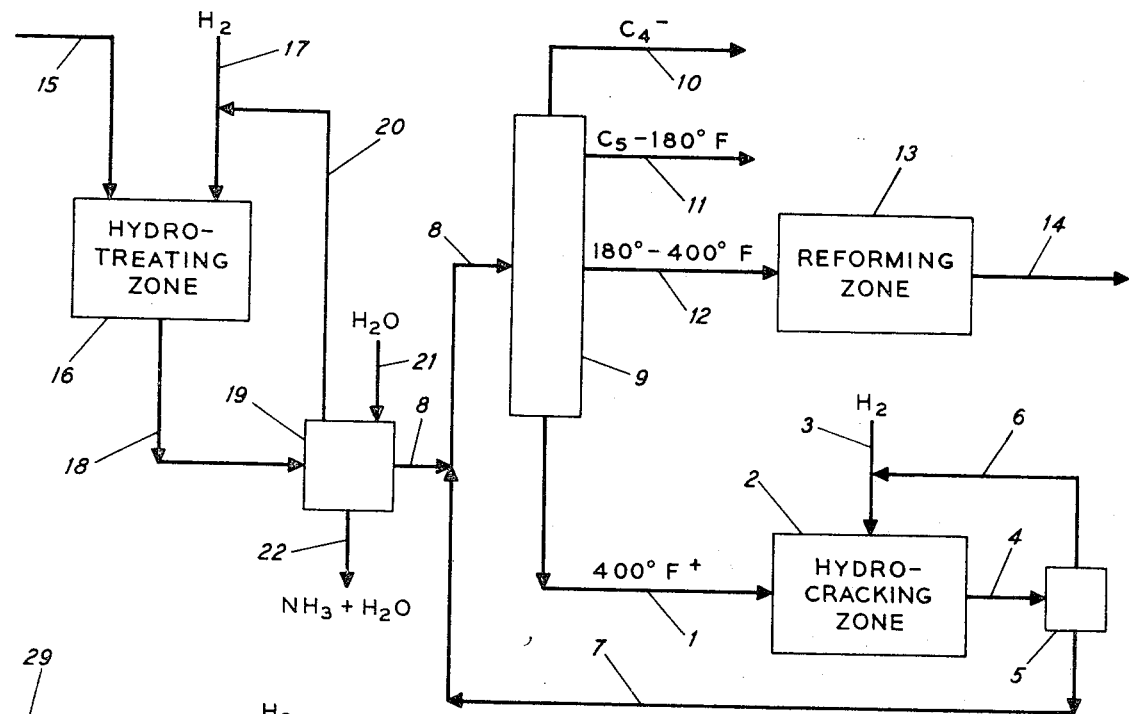

This invention relates to catalytic hydrocracking of hydrocarbons, including petroleum distillates and solvent-deasphalted residua to produce high-value fuel products, including gasoline.

PRIOR ART

It is well known that a wide variety of crystalline zeolitic molecular sieves may be used as the cracking component of hydrocracking catalysts. It is also well known that the preferred, and most commonly used, hydrogenating components associated with these zeolitic cracking supports are platinum and palladium. Rabo et al., U.S. Pat. 3,236,761, for example, discloses a particular type of decationized zeolitic molecular sieve catalyst, which may be used in some reactions without added metals, and in some reactions with added metals. The various applicable reactions are isomerization, reforming, cracking, polymerization, alkylation, dealkylation, hydrogenation, dehydrogenation and hydrocracking. Rare earths are named as metals with which the molecular sieve may be loaded, but it is not clear from the patent which reactions such a catalyst would be used to catalyze. No example of a rare earth-molecular sieve catalyst is given, and the hydrocracking portion of the disclosure indicates that the molecular sieve catalyst of the patent may be used for hydrocracking without added metals, but preferably with added platinum or palladium if a metal-loaded molecular sieve is to be used. Further, because of the great stress placed by the Rabo et al. patent on Group VIII metals in association with a molecular sieve cracking component, and particularly the Group VIII noble metals, and the absence of any interest in rare earths except a passing mention, there is no guide in the patent either as to the applicability of a rare earth-molecular siene catalyst for the hydrocracking reaction in particular, or to the amount of rare earth such a catalyst should contain, or as to the hydrocracking results that might be expected. To routinely evaluate, singly and in combinations of two, the various metals suggested by Rabo et al. on only two supports other than zeolitic molecular sieves, for all the possible reactions listed by Rabo et al., would require at least 9765 experiments. Even if the unique support material required in the catalyst of the present invention fortuitously were used in an effort to vary the Rabo et al. disclosure, its use with palladium and rare earths would be most unobvious, as would the superior results obtained thereby.

Breck et al. U.S. Pats. 3,013,990 and 3,200,082 disclose zeolitic molecular sieve catalysts containing iron, but no indication is given of the usefulness of such catalysts when, for example, palladium and cerium also are present and the unique support material of the present invention is substituted for the molecular sieve material. Wight et al. U.S. Pat. 3,450,626 discloses use of palladium with iron group metals on zeolite, as exemplified by palladium-nickel on zeolitic molecular sieve. No appreciation of the unique support of the catalyst of the present invention is indicated by Wight et al. For example, Wight et al. disclose palladium-nickel as a particularly useful embodiment of their invention; this combination of metals provides inferior results when used with the unique support of the catalyst of the present invention.

It is also known in the art to use the individual catalytic metals of the catalyst of the present invention in association with gel-type silica-alumina cracking component for the hydrocracking of hydrocarbon fractions. However, it is also known that such a catalyst has low hydrocracking activity. Further, a hydrocracking catalyst having a silica-alumina cracking component is extremely nitrogen-sensitive, and the hydrocarbon feed hydrocracked in the presence of such a catalyst must be pretreated to reduce the nitrogen content to a low level; more than minor amounts of nitrogen in the hydrocarbon feed have an intolerable poisoning effect on the acid sites of the cracking component of the catalyst, seriously diminishing cracking activity.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known, particularly from Granquist U.S. Pat. 3,252,757, that a relatively new layer crystalline alumino-silicate mineral that has been synthesized has the empirical formula

$$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limt of about 12.0 A. when A is monovalent, to about 14.7 A. when A is divalent, and to a value intermediate between 12.0 A. and 14.7 A. when A includes both monovalent and divalent cations. Upon drying and calcination whereby all or substantially all of the water is removed, said $d_{001}$ spacing changes because of structural contraction of the mineral. The equivalent of an exchangeable cation, A, in said catalyst may be chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said synthetic aluminosilicate mineral is a layered clay-type crystalline aluminosilicate, which term as used herein is intended to include dehydrated forms of said synthetic mineral, similar synthetic minerals, and corresponding identical and similar natural minerals.

Said aluminosilicate mineral, in the dehydrated (calcined) form, is known from U.S. Pat. 3,252,889 to have application as a component of a catalytic cracking catalyst; however, applications of said mineral as a component of a hydrocracking catalyst have not been disclosed heretofore, except in other patent applications of the assignee of the present application.

OBJECTS

In view of the foregoing, objects of the present invention include providing a novel catalyst useful for hydrocracking, and a novel hydrocracking process using said catalyst, said catalyst:

(1) Having a cracking component less sensitive to nitrogen poisoning than silica-alumina gel;

(2) Having a cracking component that is crystalline in structure, having pores elongated in two directions, contrary to the pores of crystalline zeolitic molecular sieves, and therefore having less reactant access limitations than the pores of such moleculer sieves;

(3) Having a first hydrogenating component providing increased activity and stability to said catalyst, compared with a similar catalyst not containing said component;

(4) Having at least one additional metal or metal compound component providing additional stability to said catalyst, compared with the same catalyst which contains said first hydrogenating component but not said additional component.

It is a further object of the present invention to provide various embodiments of a hydrocracking process using a catalyst having the aforesaid characteristics, including methods of further improving catalyst stability, and methods of operating the hydrocracking process in an integrated manner with other process units to achieve various advantageous results.

The present invention will best be understood, and further objects and advantages thereof will be apparent, from the following description when read in connection with the accompanying drawing.

DRAWING

Figure 2:
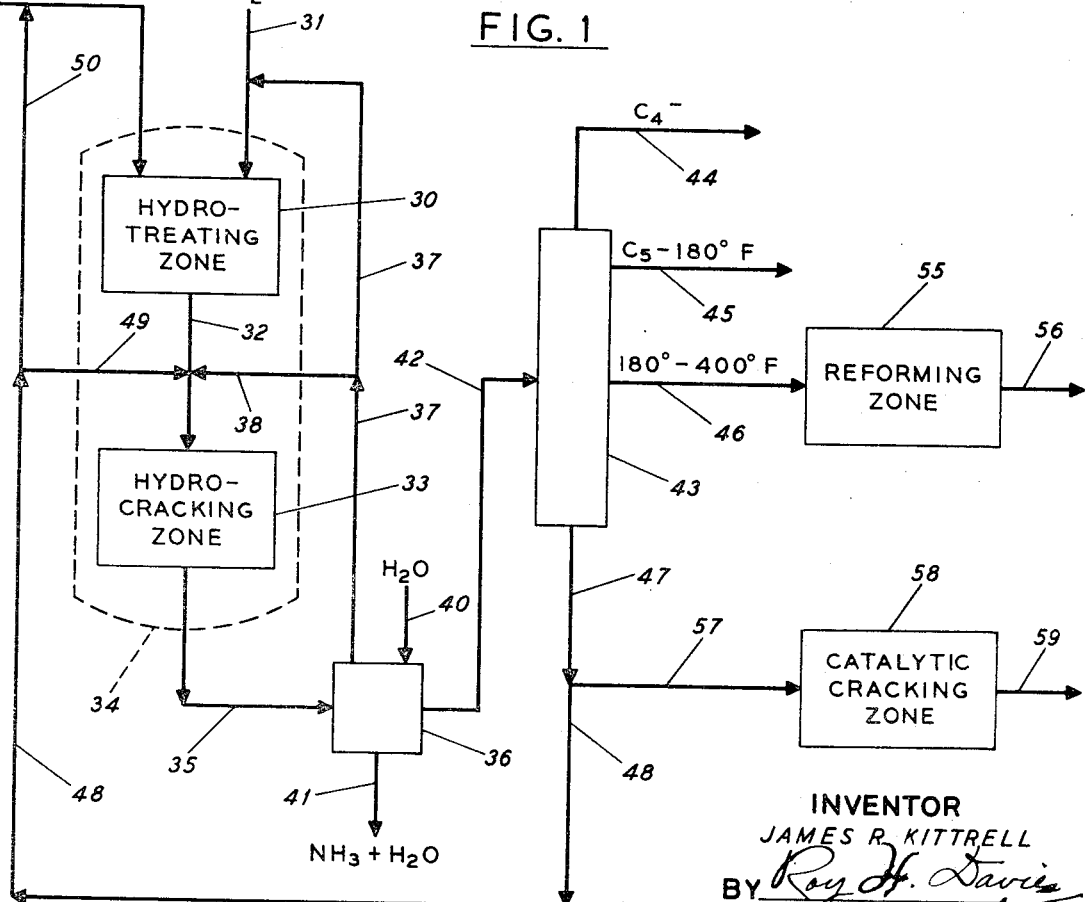

In the drawing, FIG. 1 is a diagrammatic illustration of apparatus and flow paths suitable for carrying out the process of several of the embodiments of the presnt invention, including embodiments wherein a hydrofining zone precedes the hydrocracking zone, and embodiments wherein a selected fraction from the hydrocracking zone is catalytically reformed;

FIG. 2 is a diagrammatic illustration of apparatus and flow paths suitable for carrying out the process of additional embodiments of the present invention, including embodiments wherein a hydrofining zone precede a hydrocracking zone in a single reactor shell, and embodiments wherein a selected fraction from the hydrocracking zone is catalytically cracked.

STATEMENT OF INVENTION

It has been found that a catalyst comprising a layered clay-type crystalline aluminosilicate cracking component, for example the layered synthetic clay-type crystalline aluminosilicate mineral of Granquist U.S. Pat. 3,252,757, in dehydrated form, a hydrogenating component selected from platinum and compounds thereof, palladium and compounds thereof, rhodium and compounds thereof, ruthenium and compounds thereof, nickel and compounds thereof, and iridium and compounds thereof, in an amount of 0.01 to 2.0 weight percent, calculated as metal, a rare earth metal or metal compound component in an amount of 0.01 to 5.0 weight percent, calculated as metal and based on said cracking component, has all of the desirable catalyst attributes listed under "Objects" above, and, therefore, in accordance with the present invention there is provided such a catalyst and a hydrocracking process using such a catalyst. The catalyst advantageously may contain also 0.0 to 2.0 weight percent, based on said cracking component and calculated as the metal, of a hydrogenating component selected from manganese and compounds thereof and iron and compounds thereof. It is not obvious from Rabo et al. U.S. Pat. 3,236,761 that a rare earth-crystalline zeolitic molecular sieve catalyst has application as a hydrocracking catalyst, or what rare earth levels such a catalyst should contain. It is even less obvious from Rabo et al. that not only should a rare earth metal or compound thereof be used as a component of a hydrocracking catalyst, but that the layered synthetic crystalline aluminosilicate mineral of Granquist U.S. Pat. 3,252,757 could be used instead of a crystalline zeolitic molecular sieve. It has been found that the catalyst of the present invention surprisingly provides advantages over the Rabo et al. platinum or palladium on molecular sieve hydrocracking catalyst, while unexpectedly being free from disadvantages that the art would lead one to expect. In particular, in the catalyst of the present invention: (1) the presence of the rare earth component reults in a catalyst of higher stability than a catalyst that is identical, except that contains no rare earth; and (2) the presence of the component selected from platinum and compounds thereof, palladium and compounds thereof, iridium and compounds thereof, rhodium and compounds thereof and ruthenium and compounds thereof, nickel and compounds thereof, results in a catalyst of higher activity and stability than a catalyst that is identical except that contains no such Group VIII component.

In accordance with the present invention, therefore, there is provided a hydrocracking catalyst comprising a layered, clay-type cyrstalline aluminosilicate cracking component, 0.01 to 2.0 weight percent, based on said cracking component and calculated as the metal, of a hydrogenating component selected from platinum and compounds thereof, palladium and compounds thereof, iridium and compounds thereof, rhodium and compounds thereof, ruthenium and compounds thereof, and nickel and compounds thereof, 0.01 to 5.0 weight percent, based on said cracking component and calculated as the metal, of a hydrogenating component selected from rare earth metals and compounds thereof, said cracking component having, prior to drying and calcining of said catalyst, the empirical formula

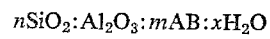

$$nSiO_2 : Al_2O_3 : mAB : xH_2O$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of neagtive ions which consists of $F^-$, $OH^-$, $\frac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations. Advantageously the catalyst also may contain 0.0 to 2.0 weight percent, based on said cracking component and calculated as the metal, of a hydrogenating component selected from manganese and compounds thereof and iron and compounds thereof.

Further in accordance with the present invention there is provided a catalyst effective for various hydrocarbon conversion reactions, including hydrocracking, hydrodesulfurization, hydrodenitrification, hydrogenation and hydroisomerization, comprising:

(A) A dehydrated layer-type, crystalline, clay-like mineral cracking component which prior to dehydration has the empirical formula $$nSiO_2 : Al_2O_3 : mAB : xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations, and (B) A hydrogenating component selected from platinum and compounds thereof, palladium and compounds thereof, rhodium and compounds thereof, ruthenium and compounds thereof, nickel and compounds thereof, and iridium and compounds thereof, in an amount of 0.01 to 2.0 weight percent, based on said cracking component and calculated as metal, a hydrogenating component selected from rare earth metals and compounds thereof, in an amount of 0.01 to 5.0 weight percent, based on said cracking component and calculated as metal, and 0.0 to 2.0 weight percent, based on said cracking component and calculated as metal, of a hydrogenating component selected from manganese and compounds thereof and iron and compounds thereof.

Said cracking component may be present in said catalyst in an amount of 10 to 99.9 weight percent, based on the total catalyst. If desired, said catalyst may further comprie a crystalline zeolitic molecular sieve cracking component in the amount of 1 to 50 weight percent, based on the total catalyst. The equivalent of an exchangeable cation, A, in said catalyst may be chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, Group VII metals, Group VIII metals, and mixtures thereof.

Said catalyst additionaly may comprise a component selected from the group consisting of alumina and silica-alumina and a hydrogenating component selected from the group consisting of Group VI metals and compounds thereof. When the catalyst comprises alumina or silica-alumina, titania advantageously may be present also. When the catalyst comprises nickel or a compound thereof, tin or a compound thereof advantageously may be present also. When said catalyst comprises said additional components, preferably the catalyst is prepared by coprecipitation of all non-crystalline components to form a slurry, followed by addition of the layered clay-type crystalline aluminosilicate component (and additionally a crystalline zeolitic molecular sieve component, if desired) to the slurry in particulate form, followed by filtering, washing and drying to produce a hydrogel matrix having said crystalline component (or components) dispersed therethrough. Preferably the finished catalyst will have substantially all of the Group VI metals located in the matrix, and said crystalline component (or components) will be in the ammonia or hydrogen form, and will contain substantially all of the hydrogenating metals, for example palladium and cerium, that are required in the catalyst of the present invention. This result will be obtained if said crystalline component (or components), loaded with the hydrogenating metals required in the catalyst of the present invention, is added to the slurry of other catalyst components at a pH of 5 or above. Alternatively, said crystalline component substantially in the hydrogen or ammonia form and substantially free of all catalytic loading metals (containing less than 0.2 weight percent of catalytic metal or metals) may be contained in the finished catalyst. This result will be obtained if the crystalline component, in the ammonia, hydrogen or sodium form, is added to the slurry of other catalytic components, including the hydrogenating metals required in the catalyst of the present invention, at a pH of 5 or above.

Further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the aforesaid catalyst comprising a layered clay-type crystalline aluminosilicate at hydrocracking conditions including a temperature in the range 200° to 950° F., a pressure in the range 400 to 3500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrogen feedstock preferably contains less than 1000 p.p.m. organic nitrogen. A prior hydrofining step may be used, if desired, to reduce the feed nitrogen content to the preferred level; however, because of the superior nitrogen tolerance of the layered clay-type crystalline aluminosilicate component, compared with silica-alumina, the hydrofining step need not accomplish complete nitrogen content reduction, as further discussed hereinafter.

Further in accordance with the present invention, advantageous results are obtained by providing in the reaction zone, in addition to said catalyst comprising a layered clay-type crystalline aluminosilicate, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a layered clay-type crystalline aluminosilicate cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed being said catalyst comprising a layered clay-type crystalline aluminosilicate, maintaining said first bed of catalyst and said second bed of catalyst at a temperature in the range 200° to 950° F. and a pressure in the range 400 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing the catalyst comprising a layered clay-type crystalline aluminosilicate in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing said catalyst comprising a layered clay-type crystalline aluminosilicate.

NITROGEN CONTENT OF FEEDSTOCKS

While the process of the present invention can be practiced with utility when supplying to the hydrocracking zone containing a catalyst comprising a layered clay-type crystalline aluminosilicate, hydrocarbon feeds containing relatively large quantities of organic nitrogen, for example several thousand parts per million organic nitrogen, it is preferred that the organic nitrogen content be 0 to 1000 parts per million; more preferably, 0 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the layered clay-type crystalline aluminosilicate component for organic nitrogen compounds, compared with silica-alumina, the hydrofining step need not accomplish complete organic nitrogen content reduction. Further, because of the superior tolerance of said component for ammonia, compared with silica-alumina, and because said component is more tolerant of ammonia than of organic nitrogen compounds, ammonia produced in the hydrofining zone either may be removed from the system between the hydrofining zone and the hydrocracking zone containing the hydrocracking catalyst comprising said component, or may be permitted to pass into the hydrocracking zone along with the feed thereto.

SULFUR CONTENT OF FEEDSTOCK

While the process of the present invention can be practiced with utility when supplying to the hydrocracking zone, containing a catalyst comprising a layered clay-type crystalline aluminosilicate, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A LAYERED CLAY-TYPE CRYSTALLINE ALUMINOSILICATE COMPONENT, A RARE EARTH OR RARE EARTH COMPOUND COMPONENT, AND A HYDROGENATING COMPONENT SELECTED FROM PLATINUM AND COMPOUNDS THEREOF, PALLADIUM AND COMPOUNDS THEREOF, IRIDIUM AND COMPOUNDS THEREOF, RHODIUM AND COMPOUNDS THEREOF, RUTHENIUM AND COMPOUNDS THEREOF, AND NICKEL AND COMPOUNDS THEREOF

(A) General

The layered clay-type crystalline aluminosilicate used in preparing the catalyst may be any catalytically active layered clay-type aluminosilicate, although the synthetic mineral, in dehydrated form, described above and in Granquist U.S. Pat. 3,252,757 is preferred. The hydrated mineral described in Granquist U.S. Pat. 3,252,757 may be used during combination of the various catalyst components; upon drying and calcination of the catalyst the mineral is converted to the dehydrated form. This component will be present in the catalyst in an amount of 10 to 99.9 weight percent, based on the total catalyst.

The rare earth component of the catalyst may be present in the final catalyst in the form of the metal, metal oxide, metal sulfide, or a combination thereof, as may any manganese or iron component of the catalyst. The rare earth metal or compound thereof may be combined with the layered clay-type crystalline aluminosilicate cracking component, or may be combined with other catalyst components in which said cracking component is dispersed, or both. In any case, the rare earth component will be present in an amount of 0.01 to 5.0 weight percent, based on said cracking component and calculated as the metal, and the manganese and iron will be present in an amount of 0.0 to 2.0 weight percent, based on said cracking component and calculated as the metal.

When a conventional crystalline zeolitic molecular sieve cracking component is included in the catalyst, said molecular sieve cracking component may be of any type that is known in the art as a useful component of a conventional hydrocracking catalyst, for example comprising a Group VIII noble metal or noble metal-compound hydrogenating component. A decationized molecular sieve cracking component is preferred. Especially suitable are faujasite, particularly Y type and X type faujasite, and mordenite, in the ammonia form, hydrogen form, alkaline earth-exchanged form, or rare earth-exchanged form.

The hydrogenating component of the catalyst that is selected from platinum, palladium, iridium, rhodium, ruthenium, nickel, and compounds of platinum, palladium, iridium, rhodium, ruthenium and nickel may be present in the final catalyst in the form of the metal, metal oxide, metal sulfide, or a combination thereof. This component may be combined with the layered clay-type crystalline aluminosilicate cracking component, or may be combined with other catalyst components in which said aluminosilicate cracking component is dispersed, or both. In any case, the component will be present in an amount of 0.01 to 2.0 weight percent, based on said aluminosilicate cracking component and calculated as the metal.

A preferred catalyst comprises a layered clay-type crystalline aluminosilicate cracking component intimately dispersed in a matrix of other catalytic components comprising alumina, silica-alumina, or silica-alumina-titania. The rare earth metal or compound thereof, and the platinum, palladium, iridium, rhodium, ruthenium or nickel, or compound of platinum, palladium, iridium, rhodium, ruthenium or nickel, may be combined with said aluminosilicate cracking component before the latter is dispersed in the matrix, or the rare metal or compound thereof and the platinum, palladium, iridium, rhodium, ruthenium, nickel, or compound of platinum, palladium, iridium, rhodium, ruthenium or nickel may be a portion of the matrix. Manganese and iron similarly may be added in a convenient manner. Examples of suitable matrices, in addition to matrices consisting of alumina or silica-alumina, include matrices comprising: (a) palladium or a compound thereof and a rare earth metal or a compound thereof and silica-alumina; (b) palladium or a compound thereof and a rare earth metal or a compound thereof and alumina; (c) iridium or a compound thereof and a rare earth metal or a compound thereof and alumina; (d) iridium or a compound thereof and a rare earth metal or a compound thereof and silica-alumina; (e) platinum or a compound thereof and a rare earth metal or a compound thereof and alumina; (f) platinum or a compound thereof and a rare earth metal or a compound thereof and silica-alumina; (g) a rare earth metal or a compound thereof and nickel or a compound thereof and alumina or silica-alumina; if desired, the nickel or compound thereof may be accompanied by tin or a compound thereof and/or by a Group VI metal or compound thereof.

(B) Method of preparation

The layered clay-type crystalline aluminosilicate mineral cracking component of the catalyst may be prepared, in hydrated form, in the manner set forth in Granquist U.S. Pat. 3,252,757. This form of the mineral may be used to combine with the other catalyst components; during drying and calcining of the resulting composition to produce the final catalyst, said mineral is converted to the dehydrated form. Alternatively, the mineral may be dehydrated and then impregnated with desired compounds.

In the case wherein a rare earth metal or a compound thereof and platinum, palladium, iridium, ruthenium, rhodium, nickel, or compound of platinum, palladium, iridium, ruthenium, rhodium or nickel are added directly to the layered clay-type crystalline aluminosilicate cracking component, impregnation using aqueous solutions of suitable hydrogenating metal compounds or adsorption of suitable hydrogenating metal compounds are operable methods of incorporating the hydrogenating component or compounds thereof into said aluminosilicate component. Ion exchange methods whereby the hydrogenating components are incorporated into said aluminosilicate component by exchanging those components with a component already present in said aluminosilicate component may be used. However, such methods require use of compounds wherein the metals to be introduced into said aluminosilicate component are present as cations.

In the case wherein said aluminosilicate cracking component first is dispersed in a matrix of other catalytic components and a rare earth metal or a compound thereof and platinum, palladium, iridium, rhodium, ruthenium, nickel, or a compound of platinum, palladium, iridium, rhodium, ruthenium or nickel are introduced into the resulting composition, impregnation using an aqueous solution of suitable hydrogenating component compounds or adsorption of suitable hydrogenating component compounds are the preferred methods.

The platinum, palladium, iridium, ruthenium, rhodium or nickel compound used in preparing the catalyst may be any convenient compound, for example platinum, palladium or iridium chloride, tetra ammino palladium nitrated, etc.

If iron or manganese are incorporated in the catalyst, any convenient compound may be used as a starting material, for example ferric nitrate or ferric chloride.

The rare earth compound used in preparing the catalyst may be any convenient compound, for example ceric ammonium nitrate or mixed rare earth chlorides.

Where the layered clay-type crystalline aluminosilicate component, with or without added hydrogenating components, is dispersed in a matrix of other catalyst components, the dispersion may be accomplished by coprecipitation, or by cogelation of said other components around said aluminosilicate component in a conventional manner.

Following combination of the catalyst components, the resulting composition may be washed free of impurities and dried at a temperature in the range 500° to 1200° F., preferably 900° to 1150° F., for a reasonable time, for example 0.5 to 48 hours, preferably 0.5 to 20 hours.

The finished catalyst may be sulfided in a conventional manner prior to use, if desired. If not presulfided, the catalyst will tend to become sulfided during process operation from any sulfur compounds that may be present in the hydrocarbon feed. As discussed elsewhere herein, the equilibrium degree of sulfiding at a given operating temperature will be different than in a corresponding catalytic system wherein a noble metal component alone is present with no rare earth being present.

SEPARATE HYDROFINING CATALYST (A) General

As previously indicated, advantageous results are obtained by providing in the reaction zone containing the hydrocracking catalyst of the present invention a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with said hydrocracking catalyst, but preferably are disposed in a separate catalyst bed located ahead of said hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above said hydrocracking catalyst in the same reactor shell.

Where said separate second catalyst is located in the same reactor shell as the hydrocracking catalyst of the present invention, it is preferably present in an amount in the range of 10 to 40 volume percent of the total amount of catalyst in the reactor.

In an arrangement somewhat different than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor in the presence of the catalyst of the present invention.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia and hydrogen sulfide.

Preferably, said separate second catalyst contains nickel or cobalt or compounds thereof in an amount of 1 to 15 weight percent, calculated as metal, and molybdenum or tungsten or compounds thereof, in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

| | Percent by weight of total catalyst, calculated as metal | | | SiO$_2$/Al$_2$O$_3$ weight ratio |
|---|---|---|---|---|
| | Ni | Mo | W | |
| 1 | 4–10 | 15–25 | | 10/90–30/70 |
| 2 | 6–15 | | 15–30 | 30/70–50/50 |

It has been found that use of said separate second catalyst increases the gasoline yield from the hydrocracking stage containing the catalyst of the present invention, compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

(B) Method of preparation

Said separate second catalyst may be prepared by any conventional preparation method, including impregnation of an alumina or silica-alumina support with salts of the desired hydrogenating component, or cogelation of all components, with the latter method being preferred.

As previously pointed out, the hydrocracking catalyst of the present invention has activity and stability advantages over certain conventional hydrocracking catalysts. It has been found that use of said separate second catalyst in the above-described arrangements further increases the stability of the hydrocracking catalyst of the present invention, compared with the stability of the latter catalyst when the identical feed thereto has not been first or concurrently processed in the presence of said separate second catalyst.

OPERATING CONDITIONS

The hydrocracking zone containing the catalyst of the present invention is operated at hydrocracking conditions including a temperature in the range 200° to 950° F., preferably 400° to 750° F., a pressure in the range 400 to 3500 p.s.i.g., preferably 1000 to 3000 p.s.i.g., and a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing the catalyst of the present invention, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst of the present invention in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 25 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising a layered clay-type crystalline aluminosilicate cracking component, 0.01 to 2.0 weight percent, based on said cracking component and calculated as metal, of a hydrogenating component selected from the metals platinum, palladium, iridium, ruthenium, rhodium, nickel, and from compounds of said metals, 0.01 to 5.0 weight percent, based on said cracking component and calculated as metal, of a component selected from rare earth metals and compounds thereof, and 0.0 to 2.0 weight percent, based on said cracking component and calculated as metal, of a hydrogenating component selected from manganese and compounds thereof and iron and compounds thereof. As previously discussed, said layered aluminosilicate component may be dispersed in a matrix of other catalyst components, which matrix may contain all or a portion of the hydrogenating components. Also as previously discussed, a separate second catalyst, previously described, may be located in hydrocracking zone 2. The feedstock is hydrocracked in hydrocracking zone 2 at conditions previously discussed, in the presence of hydrogen supplied through the 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a C$_4$$^-$ fraction which is withdrawn through line 10, a C$_5$$^-$ 180° F. fraction which is withdrawn through line 11, and a 180°–400° F. fraction which is withdrawn through line 12.

Still referring to FIG. 1, in accordance with another embodiment of the present invention, the 180°–400° F. fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22. The scrubbed feedstock is passed through line 8 to distillation column 9 and thence to hydrocracking zone 2.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocarcked in the presence of a hydrocracking catalyst comprising a layered clay-type crystalline aluminosilicate cracking component and 0.01 to 2.0 weight percent, based on said cracking component and calculated as metal, of a hydrogenating component selected from the metals platinum, palladium, iridium, ruthenium, rhodium and nickel, and from compounds of said metals, and 0.01 to 5.0 weight percent, based on said cracking component and calculated as metal, of a component selected from rare earth metals and compounds thereof, and 0.0 to 2.0 weight percent, based on said cracking component and calculated as the metal, of a hydrogenating component selected from manganese and compounds thereof and iron and compounds thereof. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5^-$ 180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are not intended in any way to limit the scope of the present invention.

Example 1

A catalyst consisting of cerium, palladium, and a layered clay-type crystalline aluminosilicate (Catalyst A, a catalyst in accordance with the present invention) was prepared in the following manner.

These starting materials were used:
(1) 500 grams of a layered synthetic crystalline alumino-silicate mineral as described in Granquist U.S. Patent 3,252,757;

(2) An aqueous solution containing 1250 gm. water, 7.18 grams of tetra ammino palladium nitrate

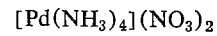

and 9.78 grams of ceric ammonium nitrate

The mineral, in powder form, was mixed with the aqueous solution to form a pasty mass. The pasty mass was dried and broken into small pieces, and then calcined. The calcined catalyst contained 0.5 weight percent palladium, calculated as metal and based on the cracking component, and contained 0.5 weight percent cerium, calculated as metal and based on the cracking component.

Example 2

A layered aluminosilicate-palladium catalyst (Catalyst B, a comparison catalyst) was prepared exactly as in Example 1, except no ceric ammonium nitrate was included in the starting materials.

Example 3

A catalyst (Catalyst C, a comparison catalyst) is prepared exactly as in Example 1, except that no palladium nitrate is included in the starting materials.

Example 4

A catalyst (Catalyst D, a catalyst in accordance with the present invention) was prepared exactly as in Example 1, except that 15.8 grams of a stock solution containing 51.4% $Mn(NO_3)_2$ and 5 gm. mixed rare earth chlorides were added instead of ceric ammonium nitrate. The calcined catalyst contained 0.5 weight percent manganese, calculated as metal and based on the cracking component.

Example 5

A catalyst (Catalyst E, a comparison catalyst) was made exactly as in Example 1, except that the following starting materials were used:
(1) 532 grams of a layered synthetic crystalline aluminosilicate mineral as described in Granquist U.S. Patent 3,252,757.
(2) An aqueous solution containing 1000 grams of water, 7.2 g. palladium ammonium nitrate and 65 grams of the stock solution of manganese described in Example 4. The calcined catalyst contained 0.5% palladium and 2.0% manganese, calculated as metal and based on the cracking component.

Example 6

Catalysts A and D were used separately to hydrocrack separate portions of a light catalytic cycle oil feedstock of the following description:

| | |
|---|---|
| Gravity, ° API | 29.7 |
| Aniline point, ° F. | 94.9 |
| Sulfur content, p.p.m. | 0.3 |
| Nitrogen content, p.p.m. | 0.1 |
| PNA analysis: | |
| P, vol. percent | 9.9 |
| N, vol. percent | 52.6 |
| A, vol. percent | 37.5 |
| ASTM D–1160 distillation: | |
| ST/5 | 333/413 |
| 10/30 | 428/459 |
| 50 | 497 |
| 70/90 | 538/610 |
| 95/EP | 664/699 |

The hydrocracking was accomplished, on a once-through liquid basis, at a total pressure of 1400 p.s.i.g., a liquid hourly space velocity of 2.0, a catalyst temperature of 520° F., and a hydrogen supply rate of approximately 12,000 s.c.f./bbl. The API gravity of the product in each case was determined, as an indication of catalyst activity. The following results were obtained:

Activity, ° API
Catalyst A _____ 51
Catalyst D _____ 52

Catalysts B and C are used to hydrocrack an additional portion of the same feedstock, at the same conditions. The API gravity of the products is 52 and 30, respectively, indicating that catalysts A, B and D are approximately equally active, and that each is more active than Catalyst C.

Example 7

Catalysts A, B, D and E were used separately to hydrocrack additional separate portions of the same feedstock used in Example 6.

The hydrocracking was accomplished, on a once-through liquid basis, at a total pressure of 1200 p.s.i.g., a conversion of 80 liquid volume percent to products boiling below 400° F., and a hydrogen supply rate of approximately 6600 s.c.f./bbl.

Because of their relatively poor stabilities, comparison Catalysts B and E were tested at a liquid hourly space velocity of 2.0. The catalyst stability, as defined by the rate of increase in temperature required to maintain 80% conversion to products below 400° F., for Catalyst B was 0.26° F./hr. and Catalyst E was 0.15° F./hr. Data on other catalysts of this class have indicated that stabilities at higher space velocities can be predicted by the relation $$\text{Stability} \propto (\text{LHSV})^{5.0}$$

However, use of a space velocity power of 2.0, typical of many other hydrocracking catalysts, will not change the conclusions of this example.

Catalyst D was tested at a liquid hourly space velocity of 2.5, and a catalyst stability of 0.35° F./hr. was observed. At this condition, comparison Catalysts B and E would exhibit stabilities of 0.9° F./hr. and 0.5° F./hr., respectively. Hence, Catalyst D of the present invention is superior to either of Catalysts B or E. The use of lower levels of rare earth chlorides in Catalyst D would have further improved its fouling rate.

Catalyst A was tested at a liquid hourly space velocity of 3.0, and a catalyst stability of 0.055° F./hr. was observed. Since this stability is better than that of comparison Catalysts B and E even when tested at the lower space velocity of 2.0, no adjustment of their stabilities is required to demonstrate the stability superiority of Catalyst A of the present invention.

CONCLUSIONS

Applicant does not intend to be bound by any theory for the unexpected superior activity and stability of the catalysts of the present invention. However, he assumes that the favorable results are largely attributable to an interaction between the effect of the rare earth metal or rare earth metal compound and a layered clay-type crystalline aluminosilicate cracking component that produces more favorable hydrocracking results than are produced by any interaction between the effect of a rare earth metal or rare earth metal compound and a gel-type silica-alumina or a crystalline zeolitic molecular sieve cracking component.

It has been shown that the process of the present invention has advantages over conventional hydrocracking processes, particularly in that the hydrocracking catalyst comprising a layered clay-type crystalline aluminosilicate cracking component, a rare earth metal or rare earth metal compound, and a hydrogenating component selected from platinum, palladium, rhodium, ruthenium, iridium, nickel, and compounds of platinum, palladium, rhodium, ruthenium, iridium, and nickel has a high stability and a high cracking activity.

What is claimed is:
1. A hydrocracking catalyst comprising a layered clay-type aluminosilicate cracking component, 0.01 to 2.0 weight percent, based on said cracking component and calculated as the metal, of a hydrogenating component selected from platinum and compounds thereof, palladium and compounds thereof, iridium and compounds thereof, ruthenium and compounds thereof, rhodium and compounds thereof and nickel and compounds thereof, 0.01 to 5.0 weight percent, based on said cracking component and calculated as the metal, of a component selected from rare earth metals and compounds of rare earth metals, and 0.0 to 2.0 weight percent, based on said cracking component and calculated as the metal, of a hydrogenating component selected from manganese and compounds thereof and iron and compounds thereof, said cracking component having, prior to drying and calcining of said catalyst, the empirical formula

$$n\text{SiO}_2:\text{Al}_2\text{O}_3:m\text{AB}:x\text{H}_2\text{O}$$

where the layer lattices comprise said silica, said alumina, and said B, and where
$n$ is from 2.4 to 3.0
$m$ is from 0.2 to 0.6
A is one equivalent of an exchangeable cation having a valence not greater than 2, and is external to the lattice,
B is chosen from the group of negative ions which consist of $F^-$, $OH^-$, $\frac{1}{2}O^{--}$ and mixtures thereof, and is internal in the lattice, and
$x$ is from 2.0 to 3.5 at 50% relative humidity,
said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

2. A catalyst as in claim 1, which further comprises a matrix containing a component selected from alumina gel and silica-alumina gel.

3. A catalyst as in claim 2, which further comprises at least one hydrogenating component selected from Group VI metals and compounds thereof.

4. A catalyst as in claim 2, wherein said layer clay-type crystalline aluminosilicate cracking component is in particulate form, and is dipsersed through said matrix.

5. A catalyst as in claim 2, which further comprises titania.

6. A catalyst as in claim 4, wherein said layered clay-type crystalline aluminosilicate cracking component is substantially in the ammonia or hydrogen form and is substantially free of any catalytic metal or metals, and wherein said hydrogenating components are contained in said matrix.

7. A catalyst as in claim 6, which further comprises titania.

8. A catalyst comprising:
(A) a dehydrated layer-type, crystalline, clay-like mineral cracking component which prior to dehydration has the empirical formula $$n\text{SiO}_2:\text{Al}_2\text{O}_3:m\text{AB}:x\text{H}_2\text{O}$$

where the layer lattices comprise said silica, said alumina, and said B, and where
$n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity,
said mineral being characterized by a $d_{001}$ spacing at said humiidty within the range which extends from a lower limit of about 10.4 A. to an upper limit of about 12.0 A when A is monovalent, to about 14.7 A. when A is divalent, and to a value intermediate between 12.0 A. and 14.7 A. when A includes both monovalent and divalent cations, and (B) a hydrogenating component selected from platinum and compounds thereof, palladium and compounds thereof, rhodium and compounds thereof, ruthenium and compounds thereof, nickel and compounds thereof, and iridium and compounds thereof, in an amount of 0.01 to 2.0 weight percent, based on said cracking component and calculated as metal, a component selected from rare earth metals and compounds thereof, in an amount of 0.01 to 5.0 weight percent, based on said cracking component and calculated as metal, and 0.02 to 2.0 weight percent, based on said cracking component and calculated as metal, of a hydrogenating component selected from manganese and compounds thereof and iron and compounds thereof.

9. A catalyst as in claim 8, wherein said mineral is present in an amount of 10 to 99.9 weight percent, based on the total catalyst.

10. A catalyst as in claim 8, which further comprises a crystalline zeolitic molecular sieve component, in the amount of 1 to 50 weight percent, based on the total catalyst.

11. A catalyst as in claim 8, wherein A is chosen from the group consisting of $H^+$, $NH_4^+$, $Na^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

12. A hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range of 200° to 950° F., a pressure in the range 400 to 3500 p.s.i.g., a liquid hourly space velocity in the range 0.1 to 5.0 and a total hydrogen supply rate of 200 to 20,000 s.c.f. of hydrogen per barrel of said feedstock, and recovering from said reaction zone valuable products, including gasoline.

13. A process as in claim 12, wherein said catalyst further comprises a component selected from the group consisting of alumina gel and silica-alumina gel.

14. A process as in claim 13, wherein said catalyst further comprises at least one hydrogenating component selected from the group consisting of Group VI metals and compounds thereof.

15. A process as in claim 12, wherein said hydrocarbon feedstock contains 0 to 1000 p.p.m. organic nitrogen.

16. A process as in claim 12, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

17. A process as in claim 16, wherein said separate second catalyst is located in said reaction zone in a bed disposed above said catalyst comprising a layered clay-type crystalline alumino-silicate cracking component.

18. A hydrocracking process which comprises sequentially contacting a hydrocarbon feedstock and hydrogen with a first bed of catalyst and then with a second bed of catalyst, said catalyst bed both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed being the catalyst of claim 1, maintaining said first bed of catalyst and said second bed of catalyst at a temperature in the range 200° to 950° F. and a pressure in the range 400 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

19. A process as in claim 18, wherein the effluent from said second bed of catalyst is separated into fractions, including a light gasoline fraction, a heavy gasoline fraction, and a fraction boiling generally higher than said heavy gasoline fraction.

20. A process as in claim 19, wherein said heavy gasoline fraction is catalytically reformed.

21. A process as in claim 19, wherein said fraction boiling generally higher than said heavy gasoline fraction is catalytically cracked.

References Cited

UNITED STATES PATENTS

| | | | |
|---|---|---|---|
| 3,132,087 | 5/1964 | Kelley et al. | 208—67 |
| 3,140,253 | 7/1964 | Plank et al. | 208—120 |
| 3,236,761 | 2/1966 | Rabo et al. | 208—111 |
| 3,252,757 | 5/1966 | Grandquist | 23—111 |
| 3,271,418 | 9/1966 | Plank et al. | 208—120 |
| 3,297,564 | 1/1967 | Peck et al. | 208—111 |

DELBERT E. GANTZ, Primary Examiner

G. E. SCHMITKONS, Assistant Examiner

U.S. Cl. X.R.

208—59, 111; 252—455 Z